(12) United States Patent
Ushigome (10) Patent No.: US 8,336,333 B2
(45) Date of Patent: Dec. 25, 2012

(54) DIFFRACTIVE OPTICAL ELEMENT AND OPTICAL SYSTEM USING THE SAME

(75) Inventor: Reona Ushigome, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 12/814,223

(22) Filed: Jun. 11, 2010

(65) Prior Publication Data

US 2010/0252942 A1 Oct. 7, 2010

Related U.S. Application Data

(62) Division of application No. 12/053,507, filed on Mar. 21, 2008, now Pat. No. 7,916,394.

(30) Foreign Application Priority Data

Mar. 28, 2007 (JP) .................................. 2007-084088

(51) Int. Cl.
*C03B 11/00* (2006.01)
*C03B 23/00* (2006.01)
*B29D 11/00* (2006.01)

(52) U.S. Cl. ............... 65/42; 65/54; 65/106; 264/1.7; 264/2.4; 264/2.7

(58) Field of Classification Search ............ 65/106, 65/42, 54; 264/1.1–2.7
See application file for complete search history.

(56) References Cited

U.S. PATENT DOCUMENTS

2003/0161044 A1 * 8/2003 Tokoyoda .................... 359/569
2004/0079114 A1 * 4/2004 Aitken et al. .................... 65/64

* cited by examiner

*Primary Examiner* — Matthew Daniels
*Assistant Examiner* — Cynthia Szewczyk
(74) *Attorney, Agent, or Firm* — Canon USA, Inc., IP Division (57) ABSTRACT

A diffractive optical element includes stacked first and second diffraction gratings made of different materials. The materials of the first and second diffraction gratings are glass. The first and second diffraction gratings have grating surfaces contacted to each other. The materials satisfy a predetermined condition when Tg2 and At2 are a transformation point temperature and a yield point temperature of the material of the first diffraction grating, and Tg3 and At3 are a transformation point temperature and a yield point temperature of the material of the second diffraction grating.

2 Claims, 8 Drawing Sheets

DIFFRACTIVE OPTICAL ELEMENT AND OPTICAL SYSTEM USING THE SAME

CROSS-REFERENCE TO RELATED APPLICATIONS

This application is a divisional application of U.S. patent application Ser. No. 12/053,507 filed Mar. 21, 2008, which claims priority to Japanese Patent Application No. 2007-084088 filed Mar. 28, 2007. Each of U.S. patent application Ser. No. 12/053,507 and Japanese Patent Application No. 2007-084088 is hereby incorporated by reference herein in its entirety.

BACKGROUND OF THE INVENTION

1. Field of the Invention

The present invention relates to a diffractive optical element suitable for an optical system applied to a video camera, a digital camera, a silver-halide film camera, or the like.

2. Description of the Related Art

As a method for reducing chromatic aberration of a lens system by a combination of glass members, a method is known in which a diffractive optical element having diffraction effect is provided at a surface of a lens, or at a part of a lens system, to reduce chromatic aberration of the lens system (see SPIE Vol. 1354 International Lens Design Conference (1990), U.S. Pat. Nos. 5,044,706, 5,790,321, and 5,044,706).

The method adopting the diffractive optical element uses a physical phenomenon in which chromatic aberration caused by a light beam with a reference wavelength through a refractive surface is a reversal of chromatic aberration through a diffractive surface.

The diffractive optical element may serve as an aspherical lens by changing the period of the periodic structure. Hence, the diffractive optical element can also reduce other aberration in addition to the chromatic aberration.

In an optical system having the diffractive optical element, if major light beams with usable light wavelengths concentrate at diffraction light with a predetermined order (hereinafter, referred to as "given order" or "design order"), the intensity of diffraction light with other orders may be low. If the intensity is zero, it theoretically means that the diffraction light does not exist.

In fact, unwanted diffraction light with orders except for the design order exists. The unwanted diffraction light passes the optical system through a passage different from that of the light beam with the design order, causing flare.

To reduce the aberration using the diffractive optical element, the diffraction efficiency of the diffraction light with the design order has to be sufficiently high for the entire usable light wavelengths.

Also, it is important to carefully consider the spectral distribution of the diffraction efficiency of the diffraction light with the design order, as well as the behavior of the unwanted diffraction light with an order except for the design order.

A diffractive optical element that improves the diffraction efficiency and reduces the unwanted diffraction light is suggested (see U.S. Pat. No. 5,847,877, U.S. Patent Application Publication No. 2003-0161044, U.S. Patent Application Publication No. 2006/0171031, U.S. Pat. Nos. 6,157,488, and 6,560,019).

The diffractive optical element, disclosed in U.S. Pat. No. 5,847,877, U.S. Patent Application Publication No. 2003-0161044, or U.S. Patent Application Publication No. 2006/0171031, has two contacting diffraction gratings, and the material and height of the diffraction gratings are appropriately determined (hereinafter, such a diffractive optical element (DOE) is referred to as "contacting two-layer DOE").

Accordingly, high diffraction efficiency of diffraction light with a desired order can be provided for wide wavelengths. It is noted that the diffraction efficiency is expressed by the ratio of the light quantity of diffraction light with an order to the light quantity of the entire transmitted light.

A diffractive optical element, disclosed in U.S. Pat. Nos. 6,157,488 or 6,560,019, has a plurality of stacked diffraction gratings, and the material and height of the diffraction gratings are appropriately determined (hereinafter, such a diffractive optical element (DOE) is referred to as "stacked DOE").

Accordingly, high diffraction efficiency of diffraction light with any order can be provided for wide wavelengths.

U.S. Pat. No. 5,847,877 discloses a contacting two-layer DOE in which diffraction gratings made of two kinds of glass members are stacked.

U.S. Patent Application Publication No. 2003-0161044, U.S. Patent Application Publication No. 2006/0171031, or U.S. Pat. No. 6,157,488 discloses contacting two-layer DOE or a stacked DOE in which two diffraction gratings made of two kinds of UV curable materials are stacked.

U.S. Pat. No. 6,560,019 discloses a stacked DOE using a glass member and UV curable resin.

Also, a contacting two-layer DOE or a stacked DOE is known in which a material of a grating surface (diffraction grating) is the same material as a substrate on which the diffraction gratings are provided.

For a contacting two-layer DOE or a stacked DOE, it is important to appropriately determine materials of a plurality of diffraction gratings, and to appropriately determine a method of manufacturing the diffraction gratings, so as to have high diffraction efficiency and high environment resistance for wide wavelengths.

If the manufacturing method is not appropriately determined especially depending on the kind of the material; it is difficult to obtain a stacked DOE having high diffraction efficiency and high environment resistance for wide wavelengths.

U.S. Pat. No. 5,847,877 discloses an embodiment of the diffractive optical element, in which diffraction gratings made of two kinds of typical glass members are contacted, however, does not disclose a specific manufacturing method of the diffraction gratings.

To manufacture the diffraction gratings with typical glass members using a mold, since the typical glass members have a yield point temperature of 600° C. or higher, the molding temperature has to be 600° C. or higher. The durability of the mold may decrease as the molding temperature increases, and hence, the productivity may decrease.

A grating pattern may be formed by directly cutting glass, or by lithography and etching. The manufacturing method may be complicated, and hence, the productivity may decrease. In addition, U.S. Pat. No. 5,847,877 does not disclose a manufacturing method for contacting the two kinds of diffraction gratings together.

U.S. Patent Application Publication No. 2003/0161044, U.S. Patent Application Publication No. 2006/0171031, U.S. Pat. Nos. 6,157,488, or 6,560,019, discloses a manufacturing method using resin as the material of the diffraction gratings. If the resin is thermoplastic resin, a transformation point temperature thereof may be 200° C. or lower. The molding temperature may be low, and the productivity may be high. If the resin is photocurable resin, the resin may be molded with exposure of light. Hence, the productivity may be high.

As described above, the productivity can be improved by using resin for the material of the diffraction grating. However, the characteristic of resin may be changed because of heat, humidity, and ultraviolet light. The environment resistance may decrease, and the application may be restricted. Also, when a mold is used for molding, a diffraction grating made of resin may be deformed because of shrinkage when being cured.

SUMMARY OF THE INVENTION

The present invention provides a diffractive optical element having high productivity, high environment resistance, and high diffraction efficiency for wide wavelengths.

A diffractive optical element according to an aspect of the present invention includes stacked first and second diffraction gratings made of different materials.

The materials of the first and second diffraction gratings are glass. The first and second diffraction gratings have grating surfaces contacted to each other. The materials satisfy the following conditions:

$Tg2 \leq 600°$ C., and $Tg3 \leq 600°$ C., and the materials satisfy one of the following conditions:

$Tg2 \neq At3$, and $Tg3 \neq At2$, where $Tg2$ and $At2$ are a transformation point temperature and a yield point temperature of the material of the first diffraction grating, and $Tg3$ and $At3$ are a transformation point temperature and a yield point temperature of the material of the second diffraction grating.

A method of manufacturing a diffractive optical element including stacked first and second diffraction gratings made of different materials, according to another aspect of the present invention, includes molding the second diffraction grating using a metal mold at a molding temperature of a yield point temperature or higher of the material of the second diffraction grating; cooling the second diffraction grating to a transformation point temperature or lower of the material of the second diffraction grating while being contacted to the metal mold, and removing the metal mold; molding the first diffraction grating using the molded second diffraction grating as a glass mold at a molding temperature in a range from the transformation point temperature or lower of the material of the second diffraction grating to a yield point temperature or higher of the material of the first diffraction grating; and cooling the first and second diffraction gratings while being contacted to each other.

A method of manufacturing a diffractive optical element including stacked first and second diffraction gratings made of different materials, according to still another aspect of the present invention, includes molding the second diffraction grating using a first metal mold at a molding temperature of a yield point temperature or higher of the material of the second diffraction grating; cooling the second diffraction grating to a transformation point temperature or lower of the material of the second diffraction grating while being contacted to the first metal mold, and removing the first metal mold; molding the first diffraction grating and a third diffraction grating at a surface opposite to the first diffraction grating using the molded second diffraction grating as a glass mold and a second metal mold for a surface opposite to the second diffraction grating at a molding temperature in a range from the transformation point temperature or lower of the material of the second diffraction grating to a yield point temperature or higher of the material of the first diffraction grating; cooling the first and second diffraction gratings and the second metal mold to a transformation point temperature or lower of the material of the first diffraction grating while being contacted to each other, and removing the second metal mold; and cooling the first and second diffraction gratings while being contacted to each other.

Further features of the present invention will become apparent from the following description of exemplary embodiments with reference to the attached drawings.

DESCRIPTION OF THE EMBODIMENTS

Diffractive optical elements according to embodiments of the present invention are described below with reference to the drawings.

A diffractive optical element has a plurality of diffraction gratings stacked on each other. The maximum difference in optical-path length of light transmitted through the plurality of diffraction gratings is substantially an integral multiple of the wavelength of the light.

The diffractive optical element has diffraction gratings of two or more layers in which first and second diffraction gratings made of two different materials are stacked.

The materials of the first and second diffraction gratings are molding glass.

Grating surfaces of the first and second diffraction gratings are contacted to each other.

First Embodiment

Figure 1:
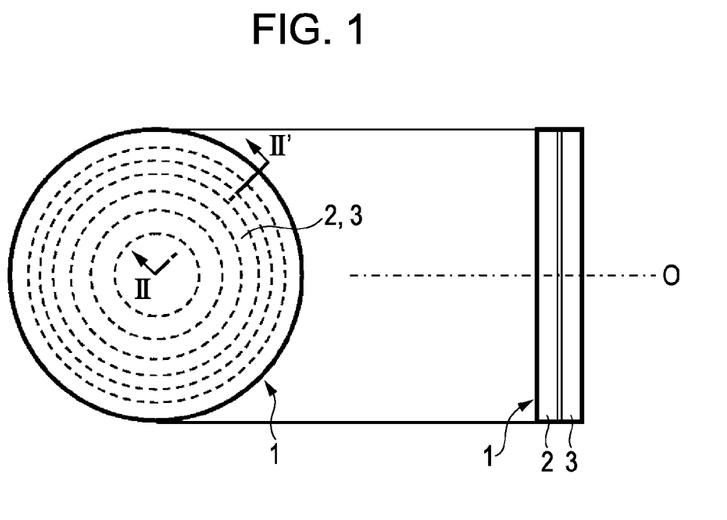
FIG. 1 includes a front view and a side view of a diffractive optical element according to a first embodiment of the present invention.

FIG. 1 includes a front view (illustrated on the left) and a side view (illustrated on the right) of a diffractive optical element according to a first embodiment. The location of an optical axis O of the diffractive optical element is illustrated for the side view.

Figure 2:
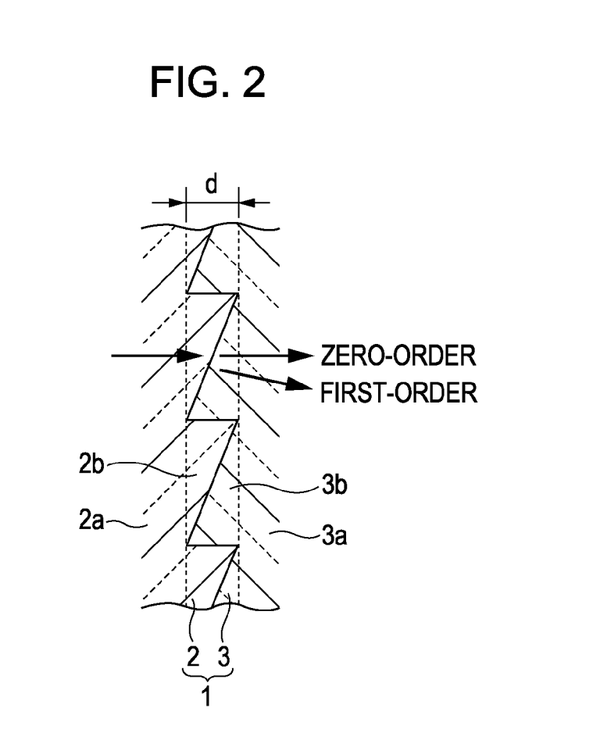
FIG. 2 is an explanatory diagram showing the element structure of the diffractive optical element according to the first embodiment.

FIG. 2 is a part of a cross section of the diffractive optical element in FIG. 1 taken along line II-II' in FIG. 1.

FIG. 2 is an illustration deformed along the grating height (depth) for easy understanding of the grating pattern. In FIGS. 1 and 2, a diffractive optical element 1 has a first diffraction grating 2 and a second diffraction grating 3, whose grating surfaces are contacted to each other.

The first diffraction grating 2 is defined by a grating portion 2b, and the second diffraction grating 3 is defined by a grating portion 3b. The grating portions 2b and 3b are arranged with a predetermined pitch. The grating portions 2b and 3b of the first and second diffraction gratings 2 and 3 have a concentric grating pattern. The grating pitch of the grating portions 2b and 3b gradually decrease from the center (optical axis) toward the periphery of the grating portions 2b and 3b, so as to provide a lens effect (convergence or divergence). All layers of the diffraction gratings 2 and 3 serve as one diffractive optical element.

In this embodiment, while the diffractive optical element 1 is illustrated as a flat plate, the surface having the diffraction gratings does not have to be flat and may be spherical, aspherical, or curved.

The diffraction gratings 2 and 3 satisfy d/P<⅙, where P (μm) is a grating pitch of the grating portions 2b and 3b, and d (μm) is a grating height (grating thickness) of the grating portions 2b and 3b. As long as the above condition is satisfied, the diffractive optical element or a mold for manufacturing the diffractive optical element can be easily machined to have such a grating pattern.

The usable light wavelengths of the diffractive optical element 1 in this embodiment are visible wavelengths. Hence, the material and grating height of the first and second diffraction gratings 2 and 3 are selected so that the diffraction efficiency of positive first-order diffraction light may be high for the entire visible wavelengths.

In particular, the material and grating height of the diffraction gratings 2 and 3 are determined so that the maximum difference in optical-path length (the maximum value of the difference between an optical-path length through the vertex of the diffraction portion and an optical-path length through the root thereof) of light transmitted through the plurality of diffraction gratings (diffraction gratings 2 and 3) is substantially an integral multiple of the wavelength of the light within the usable light wavelengths.

The material and pattern of the diffraction gratings are properly determined, and hence, high diffraction efficiency can be provided for the entire usable light wavelengths.

In this embodiment, the diffraction efficiency of a given order of the diffractive optical element for the entire usable light wavelengths is 95% or higher.

Next, the diffraction efficiency of the diffractive optical element 1 according to this embodiment is described.

When the two diffraction gratings 2 and 3 are contacted to each other to form a contacting two-layer diffractive optical element (DOE), the condition for the maximum diffraction efficiency of certain-order diffraction light with a design wavelength λ0 is determined such that the difference between the optical-path length through the vertex of the grating portion and the optical-path length through the root thereof (the difference between the optical-path length passing through the vertex of the grating portion and that passing through the root thereof) is obtained for all diffraction gratings; the values are added; and then the sum is substantially an integral multiple of the wavelength. Accordingly, in the diffractive optical element 1 of this embodiment shown in FIGS. 1 and 2, the conditional expression for the maximum diffraction efficiency of the diffraction light with the design wavelength λ0 and a diffraction order m is as follows:

$$\pm(n01-n02)d=m\lambda 0 \quad (1),$$

where n01 is a refractive index with the wavelength λ0 of a material of the first diffraction grating 2, n02 is a refractive index with the wavelength λ0 of a material of the second diffraction grating 3, d is a grating height of the first and second diffraction gratings 2 and 3, and m is a diffraction order.

Herein, it is assumed that a light beam diffracted downward with respect to the zero-order diffraction light in FIG. 2 has a positive diffraction order, whereas a light beam diffracted upward with respect to the zero-order diffraction light in FIG. 2 has a negative diffraction order. Concerning the positive or negative sign of the grating height in the expression (1), it is assumed that the relationship between refractive indices n01 and n02 of materials 2a and 3a for the diffraction gratings 2 and 3 is n01<n02.

When the grating height of the grating portions 2b and 3b increases from a lower portion to an upper portion in FIG. 2, the sign becomes negative. In contrast, when n01>n02, and the grating height of the grating portions 2b and 3b decreases from the lower portion to the upper portion in FIG. 2, the sign becomes positive. With the structure in FIG. 2, when the relationship between the refractive indices n01 and n02 is n01<n02, the expression (1) can be rewritten as follows:

$$-(n01-n02)d=m\lambda 0 \quad (2)$$

With the structure in FIG. 2, a diffraction efficiency η(λ) with a wavelength λ, which is not the design wavelength λ0, can be expressed as follows:

$$\eta(\lambda) = sinc2[\pi\{M - \{-(n01(\lambda) - n02(\lambda))d\}/\lambda\}] \quad (3)$$
$$= sinc2[\pi\{M - \phi(\lambda)/\lambda\}]$$

Herein, φ(λ) in the expression (3) can be expressed as follows:

$$\phi(\lambda)=-(n01(\lambda)-n02(\lambda))d \quad (4)$$

In the above expressions, M is the order of diffraction light to be evaluated, n01(λ) is a refractive index with the wavelength k of the material 2a of the first diffraction grating 2, n02(λ) is a refractive index with the wavelength λ of the material 3a of the second diffraction grating 3, and d is the grating height of the grating portions 2b and 3b.

Next, an implemental diffractive optical element 1 as an example is described below in more details to explain the feature of the first embodiment. In this embodiment, the materials 2a and 3a of the first and second diffraction gratings 2 and 3 employ molding glass. The molding glass is low-melting glass having a yield point temperature At of 600° C. or lower.

The material 2a of the first diffraction grating 2 employs precision molding optical glass, named K-PG395 (nd=1.658, vd=36.9, transformation point temperature Tg=363° C., yield point temperature At=392° C.), manufactured by Sumita Optical Glass, Inc.

The material 3a of the second diffraction grating 3 employs precision molding optical glass, named K-VC80 (nd=1.694, vd=53.1, Tg=530° C., At=566° C.), manufactured by Sumita Optical Glass, Inc.

The total grating thickness of the grating portions 2b and 3b of the first and second diffraction gratings 2 and 3 is 20 µm or smaller.

It is assumed that the grating height d is 16.55 µm.

Figure 3:
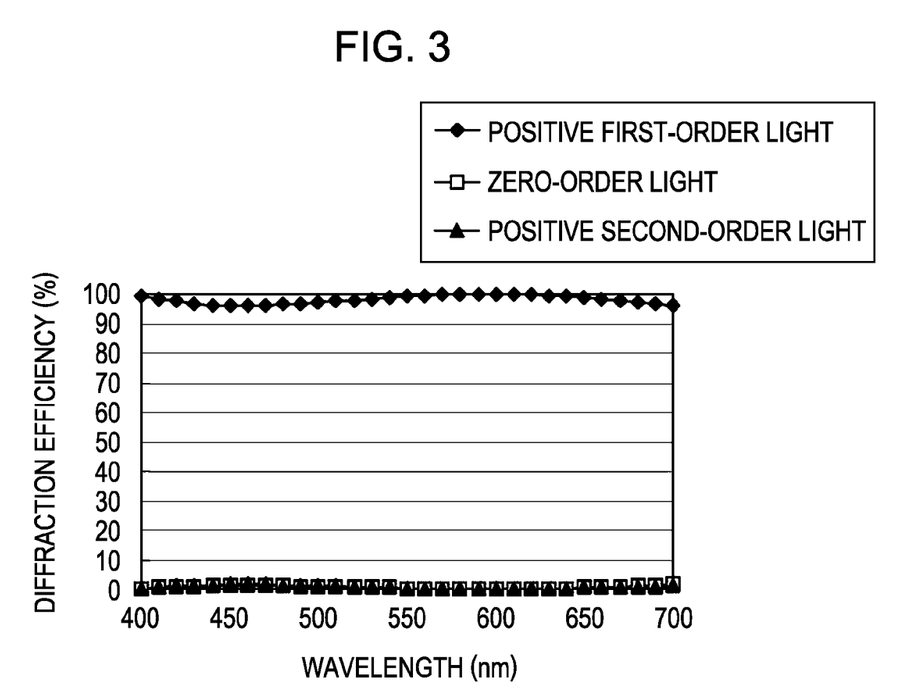
FIG. 3 is a graph showing diffraction efficiency of design orders of positive first-order diffraction light, zero-order diffraction light, and positive second-order diffraction light, of the diffractive optical element according to the first embodiment.

FIG. 3 shows the characteristic of the diffraction efficiency of the diffractive optical element with the design order (positive first order), and the characteristics thereof with the zero order and a positive second order, which are ±1 order with respect to the design order.

The diffraction efficiency of the diffraction light with the design order is 95.0% or higher for the entire visible wavelengths. Hence, unwanted flare can be 1.0% or lower for the entire visible wavelengths.

Herein, the diffraction efficiency with unwanted order light is obtained only for the zero-order and the positive second-order diffraction light because the diffraction order far from the design order may cause less flare. If the flare with the zero order and the positive second order, which are close to the design order, is reduced, flare caused by higher-order diffraction light can be also reduced. The diffractive optical element designed to mainly diffract light with a predetermined design order may have diffraction efficiency which decreases as the order comes far from the design order. The order far from the design order may cause blurring in an image plane, thereby the flare becoming less noticeable.

The characteristics that may vary due to environmental change in the expression (3) for the diffraction efficiency $\eta(\lambda)$ are the refractive index of the material and the grating height. In particular, the variation in refractive index due to the environmental change is a variation in refractive index dn/dt due to temperature change. The variation in grating height of the grating portion depends on expansion (linear expansion coefficient) due to temperature change and expansion (swelling index) due to humidity change. The variation in refractive index dn/dt, linear expansion coefficient, and swelling index of glass are about 1/10 as compared with values of resin.

The diffraction gratings 2 and 3 of the diffractive optical element 1 according to the first embodiment are made of only the glass molding materials. Therefore, with this embodiment, the variation in refractive index dn/dt, linear expansion coefficient, and swelling index can be markedly reduced as compared with the values of resin. The variation in diffraction efficiency due to the environmental change can be markedly reduced.

Also, since the diffraction grating is molded using the glass molding material, a diffraction grating with an accurate pattern can be molded as long as the grating height d of the grating portion can be reduced. To reduce the grating height of the grating portion, the Abbe number vd of the material of at least one of the first and second diffraction gratings 2 and 3 may be 40 or smaller.

In addition, the Abbe number vd of the material of at least one of the first and second diffraction gratings 2 and 3 may be 50 or greater.

In particular, the Abbe number of the glass molding material for forming the first diffraction grating 2 may be 40 or smaller, and the Abbe number of the glass molding material for forming the second diffraction grating 3 may be 50 or greater.

In the above-described first embodiment, while the diffractive optical element employs first-order diffraction light with a positive first order as the design order, the design order is not limited to the positive first order. Advantages similar to those of the first embodiment may be provided as long as the difference in the optical-path length of the diffractive optical element is determined to correspond to a predetermined design wavelength with a predetermined design order even with a positive second order, a positive third order, or the like.

Next, a manufacturing method of the implemental diffractive optical element 1 is described below in details to explain the feature of the diffractive optical element 1 of the first embodiment.

The materials of the first and second diffraction gratings 2 and 3 used in this embodiment have the following characteristics.

It is assumed that Tg2 is the transformation point temperature and that At2 is the yield point temperature of the material of the first diffraction grating 2.

Also, it is assumed that Tg3 is the transformation point temperature, and that At3 is the yield point temperature of the material of the second diffraction grating 3.

The following conditions are satisfied:

$$Tg2 \leq 600° \text{ C., and}$$

$$Tg3 \leq 600° \text{ C.}$$

Also, one of the following conditions is satisfied:

$$Tg2 \neq At3, \text{ and}$$

$$Tg3 \neq At2.$$

In particular, the first and second diffraction gratings 2 and 3 in this embodiment may employ the materials satisfying one of the following conditions:

$$Tg3 > At2, \text{ and}$$

$$Tg2 > At3.$$

More particularly, the materials may satisfy one of the following conditions:

$$Tg3 - At2 > 50° \text{ C., and}$$

$$Tg2 - At3 > 50° \text{ C.}$$

Further particularly, the materials may satisfy one of the following conditions:

$$Tg3 - At2 > 100° \text{ C., and}$$

$$Tg2 - At3 > 100° \text{ C.}$$

In this embodiment, the materials satisfy the following conditions from among the above-mentioned conditions:

$$Tg3 > At2, \text{ and}$$

$$Tg3 - At2 > 100° \text{ C.}$$

Now, the manufacturing method of the diffractive optical element using these materials is described.

The diffractive optical element 1 in this embodiment has a structure in which the first and second diffraction gratings made of different materials are stacked.

First, the second diffraction grating is molded using a metal mold at a molding temperature of the yield point temperature or higher of the material of the second diffraction grating.

The second diffraction grating is cooled to the transformation point temperature or lower of the material of the second diffraction grating while being contacted to the metal mold, and then, the metal mold is removed.

The first diffraction grating is molded, using the molded second diffraction grating as a glass mold, at a molding temperature in a range from the transformation point temperature or lower of the material of the second diffraction grating to the yield point temperature or higher of the material of the first diffraction grating.

The first and second diffraction gratings are cooled while being contacted to each other.

Referring now also to FIGS. 4A-F, an embodiment of a manufacturing method is described for manufacturing a defractive optical element according to the first embodiment of present invention.

Figure 4A:
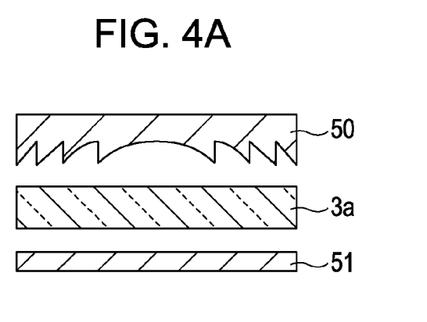
FIGS. 4A-F are explanatory diagrams showing the formation of a diffractive optical element using the manufacturing method of the diffractive optical element according to the first embodiment.

First, the diffraction grating is molded, which is one of the first and second diffraction gratings 2 and 3, and the material of which has a higher yield point temperature At.

In this embodiment, since At2=392° C. and At3=566° C., the second diffraction grating 3 has a higher yield point temperature At.

A metal mold 50 having a reversal pattern of the second diffraction grating 3, a material 3a of the second diffraction grating 3, and a metal mold 51 having a predetermined surface are prepared (FIG. 4A). A molding machine may be a typical glass molding machine for optical elements.

Figure 4B:
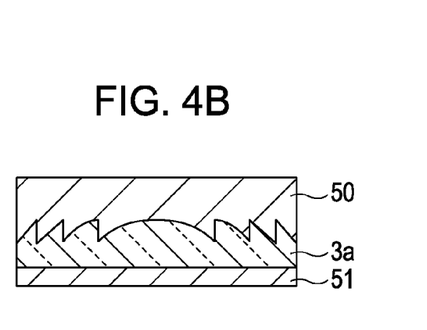

Then, the metal mold 50, the material 3a of the second diffraction grating 3, and the metal mold 51 are heated to the yield point temperature At3 or higher of the material 3a of the second diffraction grating 3, and are pressed, so that the diffraction grating pattern formed at the metal mold 50 is transferred to the material 3a of the second diffraction grating 3 (FIG. 4B).

Figure 4C:
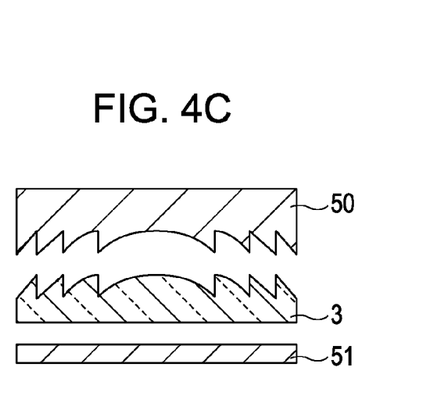

At this time, it is assumed that the inside of the molding machine is in a vacuum state, or is filled with inert gas. Next, the metal mold 50, the material 3a of the second diffraction grating 3, and the metal mold 51 are gradually cooled to the transformation point temperature Tg3 or lower of the material 3a of the second diffraction grating 3, and then, the metal molds 50 and 51 are removed (FIG. 4C).

The second diffraction grating 3 is thus formed.

Figure 4D:
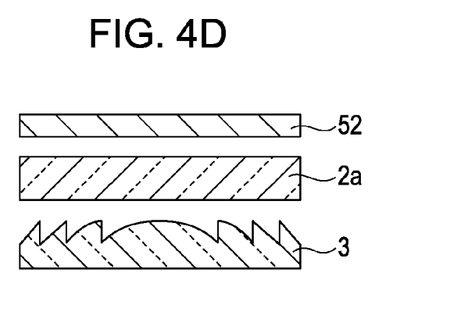

Then, the diffraction grating is molded, which is one of the first and second diffraction gratings 2 and 3, and the material of which has a lower yield point temperature At. In this embodiment, the first diffraction grating 2 is molded.

The second diffraction grating 3, a material 2a of the first diffraction grating 2, and a metal mold 52 having a predetermined surface are prepared (FIG. 4D).

Figure 4E:
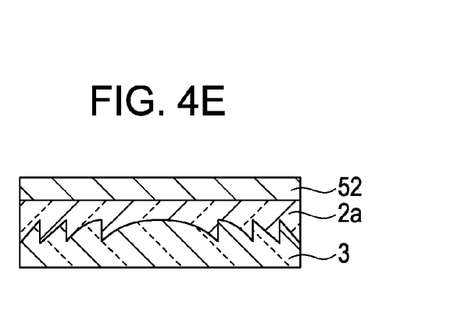

The second diffraction grating 3, the material 2a of the first diffraction grating 2, and the metal mold 52 are heated to a temperature in a range from the yield point temperature At2 or higher of the material 2a of the first diffraction grating 2 to the transformation point temperature Tg3 or lower of the material 3a of the second diffraction grating 3, and then, are pressed, so that the diffraction grating pattern formed at the second diffraction grating 3 is transferred to the material 2a of the first diffraction grating 2 (FIG. 4E).

Figure 4F:
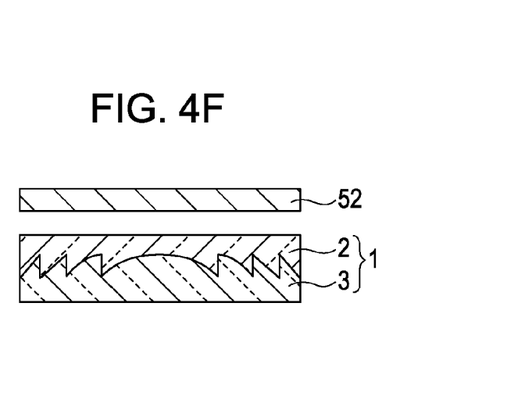

The second diffraction grating 3, the material 2a of the first diffraction grating 2, and the metal mold 52 are gradually cooled to the transformation point temperature Tg2 or lower of the material 2a of the first diffraction grating 2, and then, the metal mold 52 is removed (FIG. 4F). The first diffraction grating 2 is thus formed, and hence, the diffractive optical element 1 is completed.

One of the first and second diffraction gratings 2 and 3 may be molded using a metal mold, and the other may be molded using the molded diffraction grating as a glass mold.

In particular in this embodiment, the second diffraction grating 3 is molded first, and the first diffraction grating 2 is molded using the molded second diffraction grating 3 as a mold (glass mold). Owing to this, the materials 2a and 3a of the first and second diffraction gratings 2 and 3 are selected such that the difference between the transformation point temperature Tg3 of the material 3a and the yield point temperature At2 of the material 2a satisfies the condition: Tg3−At2>0.

If the above condition is not satisfied, the material of the second diffraction grating 3 serving as a mold when the first diffraction grating 2 is molded may be melted. The pattern of the diffraction grating may be changed, and the diffraction efficiency may decrease. The change in the grating pattern may be reduced if the difference between the transformation point temperature Tg3 of the material 3a of the second diffraction grating 3 and the yield point temperature At2 of the material 2a of the first diffraction grating 2 is large. Thus, the difference may be particularly Tg3−At2>50° C. More particularly, the difference may be Tg3−At2>100° C.

In this embodiment, the material of the first diffraction grating 2 employs the precision molding optical glass, named K-PG395 (Tg2=363° C., At2=392° C.), manufactured by Sumita Optical Glass, Inc. The material of the second diffraction grating 3 employs the precision molding optical glass, named K-VC80 (Tg3=530° C., At3=566° C.), manufactured by Sumita Optical Glass, Inc. At this time, Tg3−At2=138° C., and thus, the condition (Tg3−At2>100° C.) is satisfied.

The molded second diffraction grating 3 is used as a mold when the first diffraction grating 2 is molded, so that the second diffraction grating 3 and the material 2a of the first diffraction grating 2 are heated, and cooled after the transferring, simultaneously. Since these parts are made of glass members, the thermal expansion coefficients are approximately the same, causing a fewer stress due to the difference between a linear expansion coefficient of the mold and that of the molding material. As a result, a deformation which may occur during resin molding is minimized. A diffraction grating with an accurate pattern can be molded.

Since the second diffraction grating 3 is molded first, and then the first diffraction grating 2 is molded using the molded second diffracting grating 3 as a mold, if the strength of the second diffraction grating 3 is not sufficient, the second diffraction grating 3 may be broken due to the pressure during the molding of the first diffraction grating 2. To avoid this, the thickness (distance between the diffraction grating surface and a surface opposite thereto) of the second diffraction grating 3 may be 0.5 mm or greater, thereby providing the sufficient strength.

Figure 5:
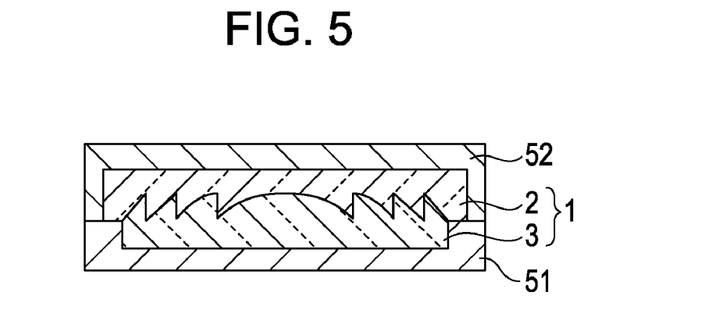
FIG. 5 is an explanatory diagram showing the outer diameter relationship of the diffractive optical element according to the first embodiment.

Also, as shown in FIG. 5 (detailed illustration of FIG. 4E for above-described the manufacturing method) showing the outer diameter relationship of the diffractive optical element 1, the outer diameter of the previously molded second diffraction grating 3 may be smaller than the outer diameter of the first diffraction grating 2.

This provides a space to which the glass molding material protrudes when the first diffraction grating 2 is molded.

If the adhesion between interfaces of the materials 2a and 3a of the first and second diffraction gratings 2 and 3 is poor, an adhesion layer may be provided between the interfaces of the first and second diffraction gratings 2 and 3. Accordingly, the adhesion can be enhanced.

If the difference between refractive indices of the materials 2a and 3a of the first and second diffraction gratins 2 and 3 is large, an antireflection layer may be provided between the interfaces of the first and second diffraction gratings 2 and 3. Accordingly, the reflectivity at the interfaces can be reduced.

While the first and second diffraction gratings 2 and 3 have flat surfaces (near the metal molds 51 and 52) located opposite to the diffraction grating surfaces, the surfaces do not have to be flat, and may be spherical, aspherical, or curved.

In this case, one of the diffraction grating surfaces and the curved surface opposite thereto may be molded simultaneously. With this configuration, the diffraction grating and the spherical, aspherical, or curved surface can be molded simultaneously, facilitating the manufacturing.

Also, with this embodiment, the second diffraction grating 3 is heated again after it is molded. Accordingly, the refractive index can be more stable than through annealing. Thus, annealing does not have to be additionally performed.

In each diffraction grating, if the distance (thickness) between the diffraction grating surface and the surface opposite thereto is large (0.5 mm or greater), the diffraction grating pattern can be more accurately transferred.

In this embodiment, one of the surfaces of the diffractive optical element may be provided with a refractive optical portion such as a lens.

The design values in this embodiment are merely example values, and do not have to be the material and height of the diffraction gratings. The same can be said to the following embodiments.

Second Embodiment

A diffractive optical element according to a second embodiment of the present invention is described below.

Figure 6:
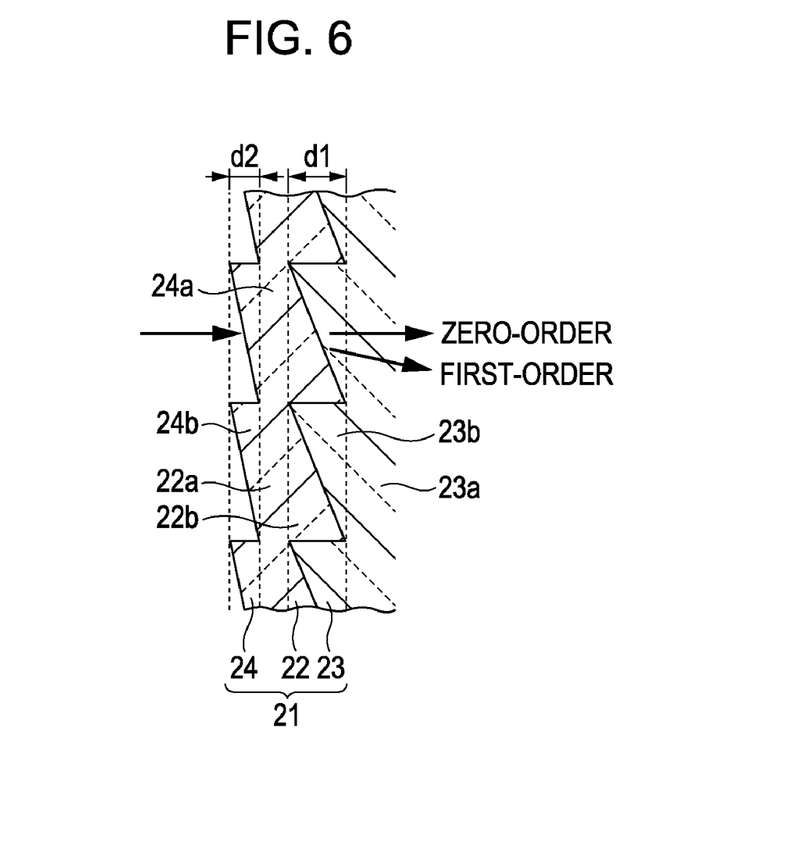
FIG. 6 is an explanatory diagram showing the element structure of a diffractive optical element according to a second embodiment of the present invention.

In the first embodiment of the present invention, the diffractive optical element is contacting two-layer DOE. The second embodiment of the present invention provides a stacked diffractive optical element (DOE) 21 including three or more layers of diffraction gratings. FIG. 6 is a cross section showing a primary portion of the second embodiment.

In this embodiment, a third diffraction grating is formed at least at one of surfaces opposite to the contacted grating surfaces of first and second diffraction gratings.

In particular, a third diffraction grating 24 is formed at a surface opposite to a grating surface of a first diffraction grating 22 having a structure the same as or alternatively similar to that of the first embodiment. The third diffraction grating 24 has a grating pitch distribution the same as or alternatively similar to those of the first and second diffraction gratings 22 and 23. A period of corresponding grating portions have a substantially uniform width. All layers of the diffraction gratings 22, 23 and 24 serve as one diffractive optical element.

Next, the diffraction efficiency of the diffractive optical element 21 according to this embodiment is described.

For the stacked DOE in which two or more diffraction grating layers are stacked, the condition for the maximum diffraction efficiency of certain-order diffraction light is determined such that the difference between the optical-path length through the vertex of the grating portion and the optical-path length through the root thereof (the difference between the optical-path lengths passing through the vertex of the grating portion and that passing through the root thereof) is obtained for all diffraction gratings; the values are added; and then the sum is substantially an integral multiple of the wavelength. Accordingly, in the diffractive optical element 21 of this embodiment shown in FIG. 6, the conditional expression for the maximum diffraction efficiency of diffraction light with a design wavelength λ0 and a diffraction order m is as follows:

$$\pm(n01-n02)d1 \pm (1-n01)d2 = m\lambda 0 \quad (5)$$

where n01 is a refractive index with the wavelength λ0 of materials 22a and 24a of the first and third diffraction gratings 22 and 24, n02 is a refractive index with the wavelength λ0 of a material 23a of the second diffraction grating 23, d1 is a grating height of the first and second diffraction gratings 22 and 23, d2 is a grating height of the third diffraction grating 24, and m is a diffraction order.

Herein, it is assumed that a light beam diffracted downward with respect to the zero-order diffraction light in FIG. 6 has a positive diffraction order, whereas a light beam diffracted upward with respect to the zero-order diffraction light in FIG. 6 has a negative diffraction order.

Concerning the positive or negative sign of the grating heights in the expression (5), it is assumed that the relationship between refractive indices n01 and n02 of materials 22a and 23a of the diffraction gratings 22 and 23 is n01<n02. When the grating height of a grating portions 22b and 23b increases from a lower portion to an upper portion in FIG. 6, the sign becomes negative.

In contrast, when n01>n02, and the grating height of the grating portions 22b and 23b decreases from the lower portion to the upper portion in FIG. 6, the sign becomes positive.

With the structure in FIG. 6, when the relationship between the refractive indices n01 and n02 is n01>n02, the expression (5) can be rewritten as follows:

$$+(n01-n02)d1 - (1-n01)d2 = m\lambda 0 \quad (6)$$

With the structure in FIG. 6, a diffraction efficiency η(λ) with a wavelength λ, which is not the design wavelength λ0, can be expressed as follows:

$$\eta(\lambda) = sinc2[\pi\{M - \{(n01(\lambda) - n02(\lambda))d1 - (1 - n01(\lambda))d2\}/\lambda\}] \quad (7)$$
$$= sinc2[\pi\{M - \phi(\lambda)/\lambda\}]$$

Herein, φ(λ) in the expression (7) can be expressed as follows:

$$\phi(\lambda) = -((n01(\lambda) - n02(\lambda))d1 - (1-n01(\lambda))d2)d \quad (8)$$

In the above expressions, M is the order of diffraction light to be evaluated, n01(λ) is a refractive index with the wavelength λ of a material of the first diffraction grating 22, n0(λ) is a refractive index with the wavelength λ of a material of the second diffraction grating 23, d1 is a grating height of the first and second diffraction gratings 22 and 23, and d2 is a grating height of a grating portion 24b of the third diffraction grating 24.

Next, an implemental diffractive optical element as an example is described below in more details to explain the feature of the second embodiment. In this embodiment, materials 22a, 23a and 24a of the first, second and third diffraction gratings 22, 23 and 24 employ molding glass.

The materials 22a and 24a of the first and third diffraction gratings 22 and 24 employ glass molding material, named M-FDS910 (nd=1.821, vd=24.1, Tg (Tg22, Tg24)=455° C., At (At22, At24)=505° C.), manufactured by Hoya Corporation. The material 23a of the second diffraction grating 23 employs glass molding low Tg optical glass S-LAL12 (nd=1.678, vd=54.9, Tg (Tg23)=562° C., At (At23)=600° C.), manufactured by Ohara Inc. It is assumed that the grating height d1 is 8.17 μm, and the grating height d2 is 2.16 μm. Since the material of the diffraction grating with a noticeably small Abbe number is used, the total grating height is smaller than that of the first embodiment.

Figure 7:
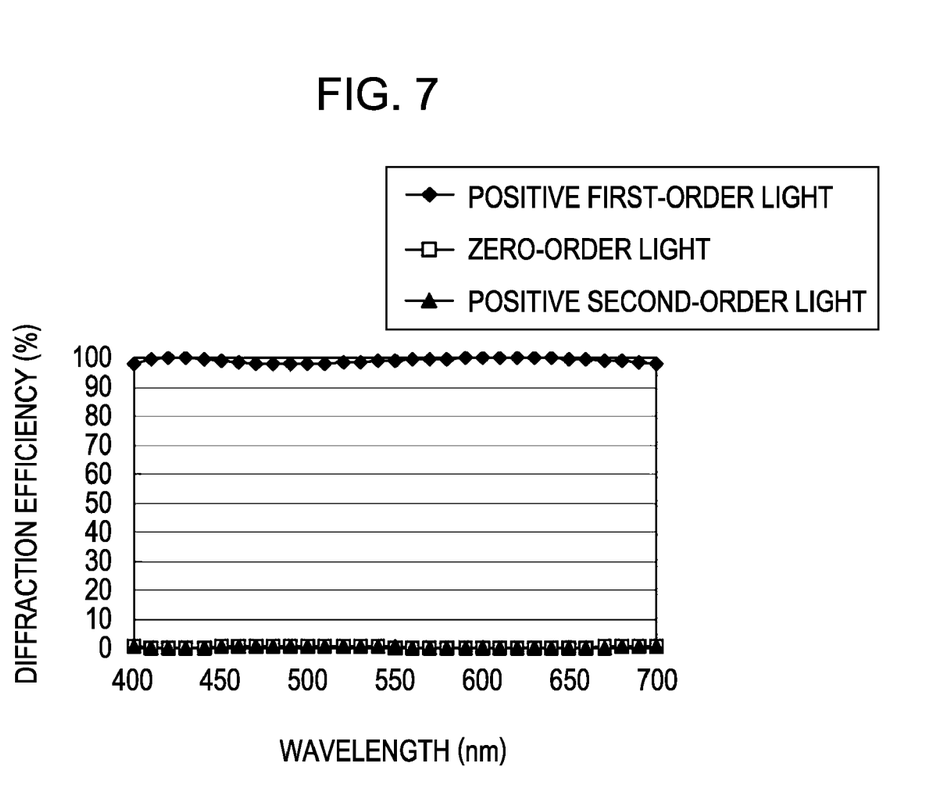
FIG. 7 is a graph showing diffraction efficiency of design orders of positive first-order diffraction light, zero-order diffraction light, and positive second-order diffraction light, of the diffractive optical element according to the second embodiment.

FIG. 7 shows the characteristic of the diffraction efficiency of the diffractive optical element with the design order (positive first order), and the characteristics thereof with the zero order and the positive second order, which are ±1 order with respect to the design order.

The diffraction efficiency of the diffraction light with the design order is 95.0% or higher for the entire visible wavelengths. Hence, flare, which is diffraction light with an unwanted order, can be 1.0% or lower for the entire visible wavelengths.

Next, a manufacturing method of the diffractive optical element 21 is described below in details to explain the feature of the second embodiment.

The manufacturing method of the diffractive optical element according to the second embodiment is as follows.

First, the second diffraction grating is molded using a first metal mold at a molding temperature of the yield point temperature or higher of the material of the second diffraction grating.

The second diffraction grating is cooled to the transformation point temperature or lower of the material of the second diffraction grating while being contacted to the first metal mold, and then, the first metal mold is removed.

The molded second diffraction grating is used as a glass mold, and a second metal mold is used for the opposite surface of the second diffraction grating.

The first diffraction grating and the third diffraction grating opposite thereto are molded at a molding temperature in a range from the transformation point temperature or lower of the material of the second diffraction grating to the yield point temperature or higher of the material of the first diffraction grating.

The first and second diffraction gratings and the second metal mold are cooled to the transformation point temperature or lower of the material of the first diffraction grating while these are contacted, and the second metal mold is removed. The first and second diffraction gratings are cooled while these are contacted to each other.

Referring now also to FIG. 8, an embodiment of a manufacturing method is described for manufacturing the diffractive optical element according to a second embodiment of the present invention is described with reference to FIG. 8.

First, the diffraction grating is molded, which is one of the first and second diffraction gratings 22 and 23, and the material of which has a higher yield point temperature At when comparing the yield point temperature At22 with the yield point temperature At23.

In this embodiment, since At23>At24, the second diffraction grating 23 is molded.

Figure 8A:
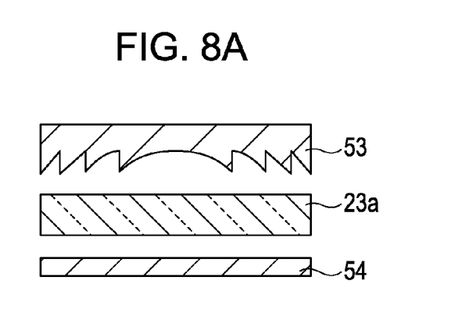
FIG. 8 is an explanatory diagram showing the manufacturing method of the diffractive optical element according to the second embodiment.

A metal mold (first metal mold) 53 having a reversal pattern of the second diffraction grating 23, a material 23a of the second diffraction grating 23, and a metal mold 54 having a predetermined surface are prepared (FIG. 8A).

Figure 8B:
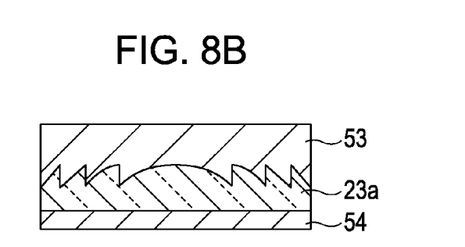

Then, the metal mold 53, the material 23a of the second diffraction grating 23, and the metal mold 54 are heated to the yield point temperature At23 or higher of the material 23a of the second diffraction grating 23, and are pressed, so that the diffraction grating pattern formed at the metal mold 53 is transferred to the material 23a of the second diffraction grating 23 (FIG. 8B).

Figures 8C, 8F:
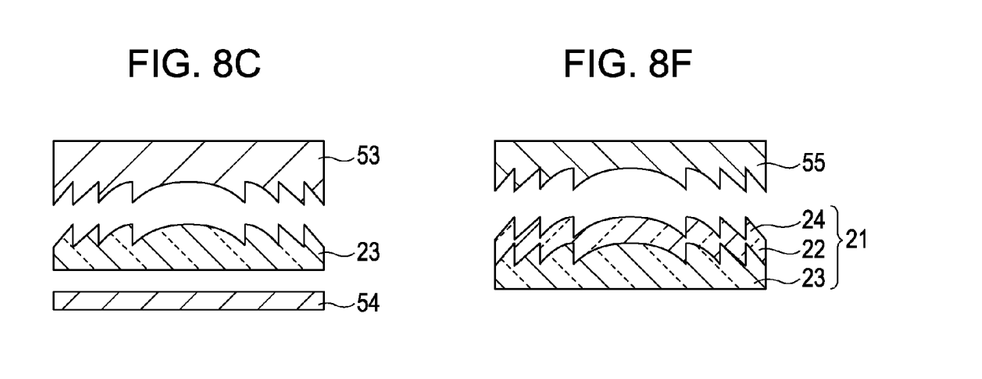

The metal mold 53, the material 23a of the second diffraction grating 23, and the metal mold 54 are gradually cooled. These are cooled to the transformation point temperature Tg23 or lower of the material 23a of the second diffraction grating 23, and then, the metal molds 53 and 54 are removed (FIG. 8C).

The second diffraction grating 23 is thus formed.

Figure 8D:
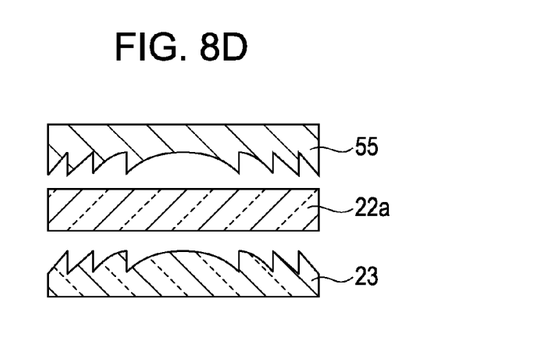

Then, the diffraction grating is molded, which is one of the first and second diffraction gratings 22 and 23, and the material of which has a lower yield point temperature At.

In this embodiment, since At22=At24<At23, the first and third diffraction gratings 22 and 24 are molded.

The second diffraction grating 23, a material 22a of the first diffraction grating 22, and a metal mold (second mold) 55 having a reversal pattern of the third diffraction grating 24 are prepared (FIG. 8D).

Figure 8E:
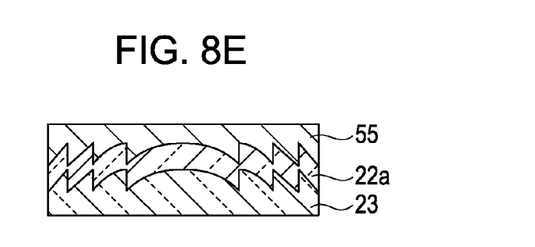

The second diffraction grating 23, the material 22a of the first diffraction grating 22, and the metal mold 55 are heated to a temperature in a range from the yield point temperature or higher (At22 or higher) of the material 22a of the first diffraction grating 22 to the transformation point temperature or lower (Tg23 or lower) of the material 23a of the second diffraction grating 23, and are pressed, so that the diffraction grating patterns formed at the second diffraction grating 23 and at the metal mold 55 are simultaneously transferred to the material 22a of the first diffraction grating 22 (FIG. 8E).

The second diffraction grating 23, the first diffraction grating 22, and the metal mold 55 are gradually cooled while being contacted to each other, to the transformation point temperature Tg22 or lower of the material 22a of the first diffraction grating 22, and then the metal mold 55 is removed (FIG. 8F).

Accordingly, the first and third diffraction gratings 22 and 24 are simultaneously formed, and hence, the diffractive optical element 21 is completed.

The second diffraction grating 23 is molded first, and the first and third diffraction gratings 22 and 24 are simultaneously molded using the molded second diffraction grating 23 as a mold (glass mold).

Assuming that At24 is a yield point temperature of the material 24a of the third diffraction grating 24, and Tg3a is a transformation point temperature of the material 23a of the diffraction grating (second diffraction grating 23) which does not have a third diffraction grating 24 at the surface opposite to the contacted surface, the following condition may be satisfied:

$$At24 < Tg3a$$

In particular, the material 22a (24a) of the first diffraction grating 22 (third diffraction grating 24) and the material 23a of the second diffraction grating 23 are selected such that the difference between the transformation point temperature Tg23 of the material 23a and the yield point temperature At22 (At24) of the material 22a (24a) satisfies the condition: At22 (At24)<Tg23. That is, it is desirable that Tg23−At22 (At24) >0.

If the condition is not satisfied, the material of the second diffraction grating 23 serving as a mold when the first diffraction grating 22 is molded may be melted. The pattern of the diffraction grating may be changed, and the diffraction efficiency may decrease.

The change in the grating pattern may be reduced if the difference between the transformation point temperature Tg23 of the material 23a of the second diffraction grating 23 and the yield point temperature At22 of the material 22a of the first diffraction grating 22 is large. Thus, the difference may be particularly Tg23−At22>50° C. More particularly, the difference may be Tg23−At22>100° C.

In this embodiment, the material of the first diffraction grating 22 employs the glass molding material, named M-FDS910 (Tg22=455° C., At22=505° C.), manufactured by Hoya Corporation. The material of the second diffraction grating 23 employs the glass molding low Tg optical glass S-LAL12 (Tg23=562° C., At23=600° C.), manufactured by Ohara Inc. At this time, Tg23−At22=57° C., and thus, the condition (Tg23−At22>50° C.) is satisfied.

Third Embodiment

A third embodiment of the present invention is described.

For the stacked DOE, the total grating thickness may be reduced by combining materials with a large difference in their Abbe numbers. There are various kinds of materials for molding glass, and thus, a diffractive optical element having a small grating thickness may be formed.

Figure 9:
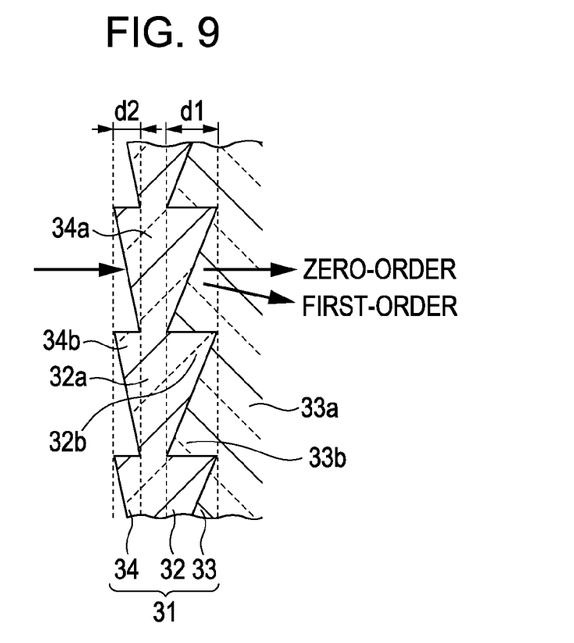
FIG. 9 is an explanatory diagram showing the element structure of a diffractive optical element according to a third embodiment of the present invention.

FIG. 9 is a cross section showing a primary portion of a stacked diffractive optical element (DOE) 31 having three-layer diffraction gratings.

The configuration of the diffractive optical element 31 according to the third embodiment is described in details. In this embodiment, molding glass is used for materials 32a, 33a and 34a for forming first, second, and third diffraction gratings 32, 33, and 34.

The materials 32a and 34a of the first and third diffraction gratings 32 and 34 employ precision molding optical glass, named K-PG325 (nd=1.507, vd=70.5, Tg=288° C., At=317° C.), manufactured by Sumita Optical Glass, Inc.

The material 33a of the second diffraction grating 33 employs precision molding optical glass, named K-PSFn2 (nd=2.002, vd=20.6, Tg=480° C., At =514° C.), manufactured by Sumita Optical Glass, Inc. It is assumed that the grating height d1 of grating portions 32b and 33b of the first and second diffraction gratings 32 and 33 is 3.37 μm, and the grating height d2 of a grating portion 34b of the third diffraction grating 34 is 4.49 μm.

Since the material with a large Abbe number and the material with a small Abbe number are used for the diffraction gratings, the total diffraction grating height may be further smaller than that of the second embodiment. Since the grating thickness is reduced, the light incident on the grating wall face is reduced, and the flare component can be reduced.

In addition, the incidence angle characteristic of the diffraction efficiency can be improved, and hence, the configuration can be applied to an optical system with a wide incidence angle.

Further, for manufacturing, a diffraction grating having a highly accurate pattern can be molded with glass.

Figure 10:
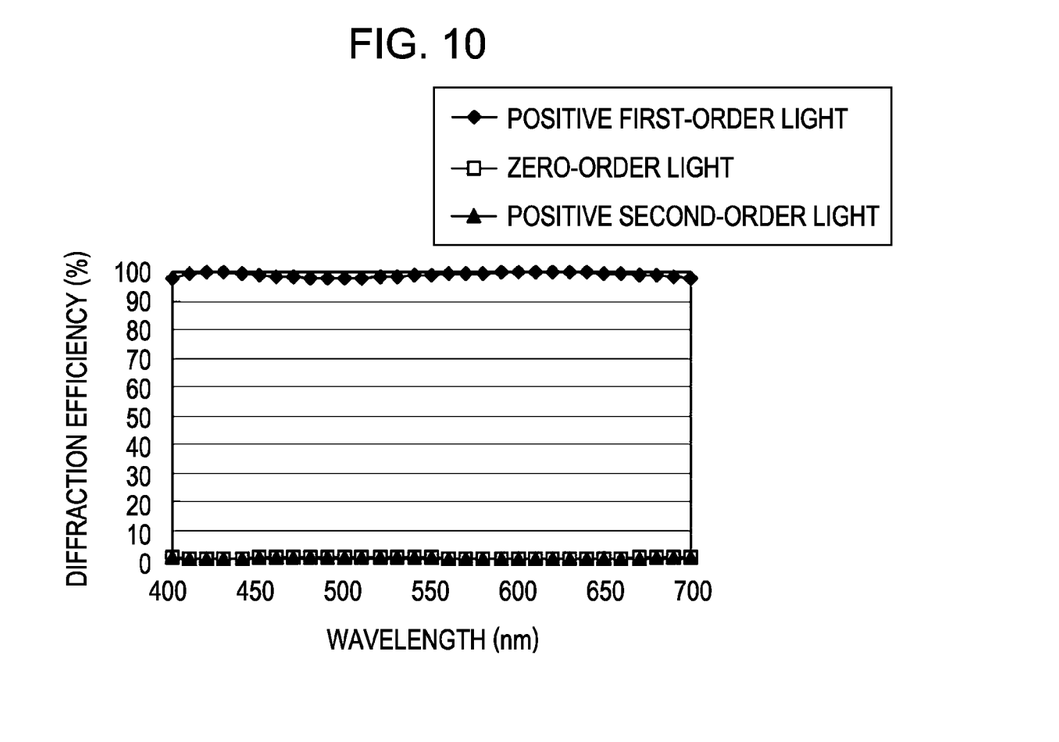
FIG. 10 is a graph showing diffraction efficiency of design orders of positive first-order diffraction light, zero-order diffraction light, and positive second-order diffraction light, of the diffractive optical element according to the third embodiment.

FIG. 10 shows characteristic of the diffraction efficiency of the diffractive optical element 31 with the design order (positive first order), and the characteristics thereof with the zero order and the positive second order, which are ±1 order with respect to the positive first order (design order).

The diffraction efficiency of the diffraction light with the design order is 95.0% or higher for the entire visible wavelengths. Hence, flare, which is unwanted-order diffraction light, can be 1.0% or lower for the entire visible wavelengths.

The manufacturing method of the diffractive optical element 31 according to the third embodiment is similar to the second embodiment. The second diffraction grating 33 is molded first, and the first and third diffraction gratings 32 and 34 are simultaneously molded using the molded second diffraction grating 33 as a mold (glass mold).

Accordingly, the difference between the transformation point temperature Tg33 of the material 33a of the second diffraction grating 33 and the yield point temperature At32 of the material 32a of the first diffraction grating 32 may be Tg33−At32>0.

If the condition is not satisfied, the material 33a of the second diffraction grating 33 serving as a mold when the first diffraction grating 32 is molded may be melted. The pattern of the diffraction grating may be changed, and the diffraction efficiency may decrease.

The change in the grating pattern may be reduced if the difference between the transformation point temperature Tg33 of the material 33a of the second diffraction grating 33 and the yield point temperature At32 of the material 32a of the first diffraction grating 32 is large. Thus, the difference may be particularly Tg33−At32>50° C. More particularly, the difference may be Tg33−At32>100° C.

In this embodiment, the materials 32a and 34a of the first and third diffraction gratings 32 and 34 employ the precision molding optical glass, named K-PG325 (Tg22=288° C., At22=317° C.), manufactured by Sumita Optical Glass, Inc.

The material 33a of the second diffraction grating 33 employs the precision molding optical glass, named K-PSFn2 (Tg33=480° C., At33=514° C.), manufactured by Sumita Optical Glass, Inc. At this time, Tg33−At32=192° C., and thus, the condition (Tg33−At32>100° C.) is satisfied.

Fourth Embodiment

Figure 11:
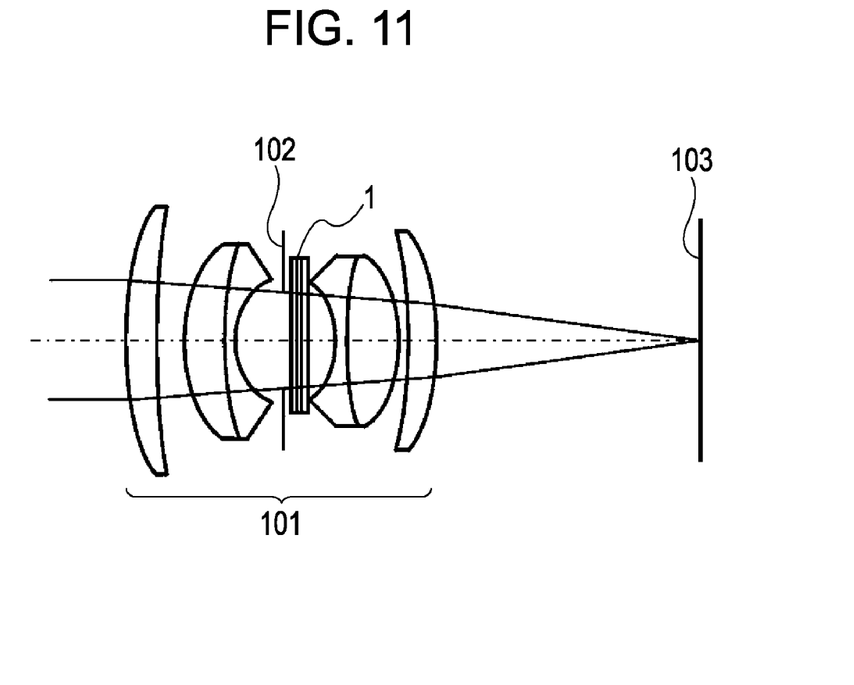
FIG. 11 is a schematic illustration showing an image-forming optical system according to a fourth embodiment of the present invention.

FIG. 11 is a schematic illustration showing a primary portion of an optical system according to a fourth embodiment of the present invention using the diffractive optical element of the embodiment of the present invention. FIG. 11 is a cross section of an image-forming optical system (optical system) used in a digital camera, a video camera, or the like.

In FIG. 11, an imaging lens 101 has a refractive lens (refractive optical portion), an aperture stop 102, and the diffractive optical element 1 of the embodiment of the present invention. The aperture stop 102 and the diffractive optical element 1 are provided in the refractive lens. An image plane 103 is a film or a charge coupled device (CCD). The diffractive optical element 1 is an element having a lens function, and corrects chromatic aberration of the imaging lens 101. Since the diffractive optical element 1 is made of molding glass as shown in any of the first to third embodiments, the diffractive optical element 1 has good moldability and high environment resistance. In addition, the optical system can be easily manufactured by manufacturing the diffraction gratings, and then bonding different refractive optical elements at peripheral portions thereof. The optical system having good productivity can be provided.

While the diffractive optical element 1 has a flat glass plate as a substrate and is provided near the aperture stop 102, it is not limited thereto. The diffractive optical element 1 may have a lens as a substrate, and may be provided on a concave surface, or a convex surface of the lens. In addition, a plurality of diffractive optical elements may be used in the imaging lens.

While this embodiment illustrates an imaging lens for a camera, it is not limited thereto. The diffractive optical element of the embodiment of the present invention can be applied to an optical system for wide wavelengths, such as an imaging lens of a video camera, an image scanner of a business machine, or a reader lens of a digital copier. This can provide similar advantages.

Fifth Embodiment

Figure 12:
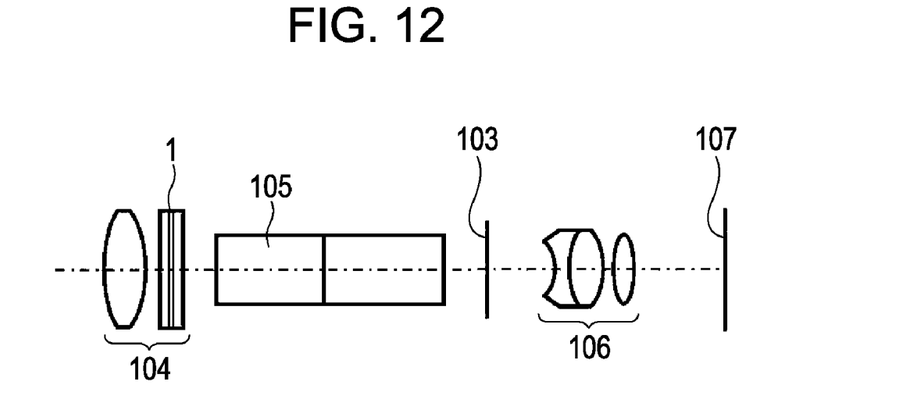
FIG. 12 is a schematic illustration showing an observing optical system according to a fifth embodiment of the present invention.

FIG. 12 is a schematic illustration showing a primary portion of an optical system according to a fifth embodiment of the present invention using the diffractive optical element of the embodiment of the present invention. FIG. 12 is a cross section of an observing optical system such as a telescope or a binocular. In FIG. 12, an objective 104, an image inversion prism 105 for establishing an image, an eyepiece 106, and an evaluation plane (pupil plane) 107 are illustrated.

Reference numeral 1 denotes a diffractive optical element of the embodiment of the present invention. The diffractive optical element 1 is provided for correcting chromatic aberration and the like generated at the image plane 103 of the objective 104. If the diffractive optical element 1 is provided near an object with respect to the image plane 103, the chromatic aberration only at the objective 104 can be reduced. Thus, the diffractive optical element 1 should be provided at least at the objective 104 for an observing system that is observed with eyes.

Since the diffractive optical element 1 of the observing optical system in FIG. 12 is made of molding glass as shown in any of the first to third embodiments, the diffractive optical element 1 has good moldability and high environment resistance. Accordingly, high optical performance can be provided with reduced flare, and high resolution at low frequencies, under various operating environments. In addition, the optical system can be easily manufactured by manufacturing the diffraction gratings, and then bonding different refractive optical elements at peripheral portions thereof. The observing optical system having good productivity can be provided.

While the diffractive optical element 1 has a flat glass plate as a substrate and is provided as shown in FIG. 12, it is not limited thereto. The diffractive optical element 1 may have a lens as a substrate, and may be provided on a concave surface, or a convex surface of the lens. Further, a plurality of diffractive optical elements of the embodiment of the present invention can be used.

In the observing optical system in FIG. 12, while the diffractive optical element 1 is provided at the objective 104, it is not limited thereto. The diffractive optical element 1 may be provided at the surface of the prism 105, or at a position inside the eyepiece 106. This can provide similar advantages.

While this embodiment illustrates a binocular, it is not limited thereto. The diffractive optical element may be applied to an observing optical system, such as a terrestrial telescope, or a telescope for astronomical observation. This can provide similar advantages. The diffractive optical element may be applied to an optical finder, such as a lens shutter camera, or a video camera. This can provide similar advantages.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method of manufacturing a diffractive optical element comprising stacked first and second diffraction gratings made of different materials, wherein the materials of the first and second diffraction gratings are glass, wherein the first and second diffraction gratings have grating surfaces contacted to each other, wherein the materials satisfy the following conditions, $Tg2 \leq 600°$ C., and $Tg3 \leq 600°$ C.

wherein the materials satisfy one of the following conditions, $Tg3 > At2$, and $Tg2 > At3$, where Tg2 and At2 are a transformation point temperature and a yield point temperature of the material of the first diffraction grating respectively, and Tg3 and At 3 are a transformation point temperature and a yield point temperature of the material of the second diffraction grating respectively, the method comprising:

molding the second diffraction grating using a metal mold at a molding temperature of At3 or higher;

cooling the second diffraction grating to Tg3 or lower while being contacted to the metal mold, and removing the metal mold;

molding the first diffraction grating using the molded second diffraction grating as a glass mold at a molding temperature in a range from Tg3 or lower At2 or higher of the material; and cooling the first and second diffraction gratings while being contacted to each other.

2. A method of manufacturing a diffractive optical element comprising stacked first and second diffraction gratings made of different materials, wherein the materials of the first and second diffraction gratings are glass, wherein the first and second diffraction gratings have grating surfaces contacted to each other, wherein the materials satisfy the following conditions, $Tg2 \leq 600°$ C., and $Tg3 \leq 600°$ C.

wherein the materials satisfy one of the following conditions, $Tg3 > At2$, and $Tg2 > At3$, where Tg2 and At2 are a transformation point temperature and a yield point temperature of the material of the first diffraction grating respectively, and Tg3 and At3 are a transformation point temperature and a yield point temperature of the material of the second diffraction grating respectively, the method comprising:

molding the second diffraction grating using a first metal mold at a molding temperature of At3 or higher cooling the second diffraction grating to Tg3 or lower while being contacted to the first metal mold, and removing the first metal mold;

molding the first diffraction grating and a third diffraction grating at a surface opposite to the first diffraction grating using the molded second diffraction grating as a glass mold and a second metal mold for a surface opposite to the second diffraction grating at a molding temperature in a range from Tg3 or lower At2 or higher;

cooling the first and second diffraction gratings and the second metal mold to Tg2 or lower while being contacted to each other, and removing the second metal mold; and cooling the first and second diffraction gratings while being contacted.

* * * * *